United States Patent [19]

German et al.

[11] Patent Number: 5,602,350

[45] Date of Patent: Feb. 11, 1997

[54] METHOD FOR COMPACTING COMPACTABLE MATERIALS AND IMPROVED LUBRICANT FOR SAME

[75] Inventors: Randall M. German; Anthony Griffo; Tracy Potter, all of State College, Pa.

[73] Assignee: The Penn State Research Foundation, University Park, Pa.

[21] Appl. No.: 440,858

[22] Filed: May 15, 1995

[51] Int. Cl.$^6$ ............................ C22C 33/02; C22C 27/04
[52] U.S. Cl. .............................. 75/231; 75/245; 75/246; 75/248; 419/10; 419/37; 419/39; 419/54; 419/58
[58] Field of Search ............................ 75/231, 246, 248, 75/245; 419/10, 37, 39, 54, 58; 501/153, 154

[56] References Cited

U.S. PATENT DOCUMENTS

| | | | |
|---|---|---|---|
| 2,715,617 | 8/1955 | White. | |
| 3,086,860 | 4/1963 | Moutaud. | |
| 3,273,977 | 9/1966 | Davis. | |
| 3,558,550 | 1/1971 | Zuliani et al.. | |
| 3,970,485 | 7/1976 | Doser | 148/103 |
| 4,283,260 | 8/1981 | Henmi et al. | 264/63 |
| 4,609,527 | 9/1986 | Rinderle et al. | 419/32 |
| 4,676,949 | 6/1987 | Miyashita et al. | 419/32 |
| 4,693,864 | 9/1987 | Lloyd | 419/23 |
| 4,795,598 | 1/1989 | Billiet | 264/40.6 |
| 5,240,513 | 8/1993 | McCallum et al. | 148/104 |
| 5,368,630 | 11/1994 | Luk | 75/252 |
| 5,472,661 | 12/1995 | Gay | 419/36 |
| 5,527,376 | 6/1996 | Amick et al. | 75/246 |

OTHER PUBLICATIONS

Dupont De Nemours, Inc., Products Brochure regarding MP 1100 (two pages).

R. D. McIntyre, "The Effect of HCl–$H_2$ Sintering Atmospheres on Properties of Compacted Tungsten Powder", Transactions of the ASM, vol. 56, pp. 468–476 (nine pages).

R. D. McIntyre, "The Effect of HCl–$H_2$ Sintering Atmospheres on the Properties of Compacted Iron Powder", Transactions of the ASM, vol. 57, pp. 351–354 (four pages).

R. M. German, et al. "Comparative Evaluation of Lubricants for Ferrous Structure Alloys", Metal Powder Report, 1987. 429(11), pp. 781–785 (five pages).

A. Phillips and P. Pourtalet. "Optimizing $N_2/H_2$ Atmospheres for P/M Lubricant Removel", Industrial Heating. Apr. 1992, pp. 36–38 (four pages).

J. Dwyer, et al., "Comparative Studies of P/M Lubricants Under Different Atmospheres Using TGA Techniques", Advances in Powder Metallurgy and Particulate Materials, 1992, 3, pp. 183–192 (six pages).

K. Hwang and K. Lin, "Lubricant Removal in Metal Powder Compacts", The International Journal of Powder Metallurgy, 1992, 28(4), pp. 353–360 (seven pages).

Primary Examiner—Ngoclan Mai
Attorney, Agent, or Firm—Thomas J. Monahan

[57] ABSTRACT

The present invention discloses an improved method for compacting powdered materials, including ferrous alloys, non-ferrous metals or non-metal powders, wherein the improved method includes the use of an improved lubricant during the compaction process. The improved lubricant includes vinyl halides, generally, and polytetrafluroethylene, specifically. In a preferred embodiment of the present invention, 0.2 to 0.6 wt. % of the vinyl halide is added to the powdered form of the compactable material before the compaction and sintering of the compactable material.

29 Claims, 12 Drawing Sheets

METHOD FOR COMPACTING COMPACTABLE MATERIALS AND IMPROVED LUBRICANT FOR SAME

BACKGROUND OF THE INVENTION

1. Field of the Invention

The present invention is directed to improved lubricants for the compaction and sintering of powdered materials, and specifically to a lubricant including vinyl halides and more specifically, to a lubricant including polytetrafluoroethylene and other vinyl halides for the compaction and sintering of ferrous alloys, non-ferrous metals and non-metals. The improved lubricant results in compacted materials having improved powder flow, improved powder packing, higher green densities, reduced die wear, reduced die scoring and reduced die seizure during ejection with less admixed lubricant and the ability to increase lubricant concentrations without negatively affecting green strength. The improved properties during sintering include less pollutants, a clean burn resulting in no soot remaining after delubing, reduced dimensional change during sintering, and a cleaner powder surface as the vinyl halide acts as a "getter" and tends to clean the powder surface before sintering occurs and the existence of smaller pores in the compacted material after burnout of the lubricant. The improved post-sintering properties include higher sintered densities, greater sintered tensile strength, the ability to increase lubricant content without negatively affecting sintered tensile strength and increased hardness of the compacted material.

2. Background Information

In the typical compaction process, a material in the form of a powder, which is typically either a ferrous alloy, a non-ferrous alloy or a non-metal, is compacted in a press in a die to form a compact of a desired configuration.

The density of the compacted material immediately after compaction is referred to as its "green" density. Upon removal from the die, the compacted material is sintered. The density after sintering is referred to as the "sintered" density.

Recently, automotive and other industry users of parts and components comprised of compacted/sintered materials have looked for increased green densities and strengths over an increasingly wider compaction range. Increased green density results in improved properties after sintering, including increased hardness and tensile strength of the compacted/sintered component. Unfortunately, the higher density pressing of compacted materials, including ferrous alloys, non-ferrous metals and non-metals, increases the rate of die wear.

Lubricants, when added to the powdered material to be compacted, decrease die wear and improve the compaction process. The lubricants can be introduced into the material to be compacted as a powder or they can be sprayed as a coating into the die cavity and onto the punches.

The two most common lubricants are zinc stearate and ethylene-bistearamide (hereinafter "EBS"). Each lubricant has advantages and disadvantages over the other. EBS results in lower dimensional swelling of the component after compaction, however it results in components exhibiting lower green and sinter densities with respect to zinc stearate. On the other hand, zinc stearate is environmentally unfriendly and leaves residues after burnout, while EBS can be easily removed from the compacted material during delubing. Further, removal of EBS from a compacted material requires far less hydrogen and lower temperatures than required to remove the same amount of zinc stearate. Therefore, an improved lubricant would include the best properties of both zinc stearate and EBS without their attendant disadvantages.

Efforts have been made in the art to improve green densities and other green physical properties and, in turn, sintered densities and sintered physical properties by focusing on improving the lubricant itself. Lubricant characteristics, such as particle size, thermal stability, coefficient of friction and true densities, are being studied to promote the highest green densities possible. Nonetheless, a need remains in the art for a lubricant which can improve green densities, other green physical properties, sintered densities and sintered physical properties, which is environmentally acceptable, is clean burning and can be easily removed at lower temperatures while providing those desired higher green densities and strengths over the entire compaction range.

SUMMARY OF THE INVENTION

The present invention discloses an improved method for compacting powdered materials, including ferrous alloys, non-ferrous metals or non-metal powders, wherein the improved method includes the use of an improved lubricant during the compaction process. The improved lubricant includes vinyl halides, generally, and polytetrafluoroethylene (hereinafter "PTFE"), specifically. In a preferred embodiment of the present invention, 0.2 to 0.6 wt. % of the vinyl halide is added to the powdered form of the compactable material before the compaction and sintering of the compactable material.

The improved lubricant of the present invention is a particularly suitable choice for high density pressing, since it has a low coefficient of friction and is stable to relatively warm pressing temperatures. In addition, it can act as a deoxidation source that cleans the powder surface of impurities. It allows high green densities over a wide compaction range and thereby, increases sintered properties without modification to existing compaction or sintering operations. In addition, due to the improved lubricant's extremely low coefficient of friction, die wear will be significantly reduced without the necessity of large amounts of admixed lubricant. The density of the improved lubricant is significantly higher than conventional lubricants allowing for greater densities at high pressure since it occupies a lower volume than either lubricant known in the prior art.

DESCRIPTION OF THE PREFERRED EMBODIMENTS

The present invention is directed to an improved method for the compaction of compactable materials, including ferrous alloys, non-ferrous metals and non-metals, wherein the improved method includes the use of an improved compaction lubricant, wherein the improved lubricant is comprised entirely of or at least includes the use of vinyl halides, in general, and PTFE, in particular. The lubricant may be comprised entirely of the vinyl halide, or it may be blended with known compaction lubricants such as zinc stearate and/or EBS. EBS is available from Shamrock Technologies Corp. of Newark, N.J. and is under the commercial name of ACRAWAX from LONZA, Inc. of Fair Lawn, N.J. The inventive lubricant may be blended with the powdered compactable material or it may be sprayed into die cavities or onto punches.

The PTFE of the present invention is available in the form of a small particle powder under the trade name Teflon® MP1100 from Dupont De Nemours Co. of Wilmington, Del. MP1100 has an average particle size of 1.8 to 4 μm with a high specific surface area and narrow particle size distribution.

The compaction process itself is taught in various standard textbooks, such as *Powder Metallurgy Science,* 2d ed., Metal Powder Industries Federation, Princeton, N.J. (1994), which is hereby incorporated by reference. During the compaction process, a compactable powder, such as a ferrous alloy, non-ferrous metal or non-metal, is mixed either dry or wet, with a lubricant in a desired ratio. The powder may be atomized, such as a water atomized powder, a gas atomized powder or a plasma rotating electrode powder, or reduced from a metal compound, such as an oxide. The typical range for the addition of lubricant is in the range of 0.2 to 0.6 wt. % of the compactable powder. A Turbula or twin shell or double cone mixer is an example of satisfactory equipment for mixing. Typically, the mixer is filled to approximately 40% of its volume. After mixing, the compactable powder and lubricant mixture is subjected to uniaxial die compaction in rigid tool steel or cemented carbide tooling at pressures in the range of 400 to 700 MPa to form a compact. The compact may take any form, but tensile bars having an area of 1 in.$^2$ or 6.5 cm squared are common for testing purposes.

These compacts are then sintered in a furnace, either batch or continuous. The total heating time applied to the compact is generally on the order of 180 minutes to allow for both volatilization of the lubricant and sintering of the compact. A furnace typically includes a sequence of temperature zones. Burnout of the lubricant is achieved in one or more heat zones or stages followed by sintering in a final heat zone at the high heat required for sintering. Burnout of the lubricant usually occurs around 500° to 700° C. Sintering temperatures are typically in the range of 1120° to 1260° C. The time at sintering temperature is typically approximately 40 minutes. Runs through the furnace end with the compact being cooled to room temperature in a cooling zone.

The inventors believe that all of the vinyl halide present evaporates during the heating process, as shown through the thermogravimetric plots in FIG. 1 discussed in detail below. Further, the inventors believe that as the vinyl halide burns out during heating in the decomposition process, it alters sintered properties.

In accordance with the present invention, the improved lubricant is comprised entirely of vinyl halide, or is a mixture of vinyl halide with traditional lubricants, such as stearic acid, EBS or zinc stearate. Where the inventive lubricant of the present invention is admixed with either stearic acid, EBS or zinc stearate, it is preferably mixed in a range of 10 to 99 wt. % of the inventive lubricant per weight of stearic acid, EBS or zinc stearate.

Examples of ferrous alloys compatible with the present invention include commercially available FC0208 and Distaloy 4800A both of which are available from Hoeganaes Corporation of Riverton, N.J. Non-ferrous metals suitable for use with the present invention include nickel, chromium, titanium, aluminum, copper and tungsten. Non-metals suitable for use with the present invention include alumina and silica.

The improved lubricant of the present invention was evaluated experimentally and compared alongside the traditional lubricant EBS. Compacts formed with the improved lubricant and EBS, respectively, were both analyzed for burnout characteristics using a thermogravimetric analysis (hereinafter "TGA"). Green density and green strength of the compacts were also evaluated. Finally, sintered properties, such as hardness, density and strength of the compacts, were also analyzed.

EXPERIMENTAL OVERVIEW

More specifically, powdered blends of commercially available FC0208 ferrous alloy and Distaloy 4800A alloy (admixed 0.5 wt. % carbon) were respectively mixed with 0.2, 0.4 or 0.6 wt. % of either EBS or PTFE. The resulting powder mixtures were respectively compacted using a 60 ton uniaxial press and floating die into 1 in.$^2$ tensile bars at three different pressures, namely 30 Tsi (420 MPa), 40 Tsi (560 MPa), or 50 Tsi (690 MPa). The samples were weighed and measured to determine green density. Green rupture strengths were measured with an MTS 20 kip tensile tester, a screw-type tensile machine with a cross-head speed of 0.1 in/min (0.25 cm/min).

The compacts were then sintered using a CM pusher furnace set at 1260° to 1265° C. at a push rate of 33 cm/h (13 in/h). The furnace used a three zone preheat for burnout (also known as delubing) to burn off the lubricant, wherein the three zones were set at 400°, 500° and 600° C., respectively. The atmosphere was 50 vol % H₂/50 vol % N₂ with a flow rate of 30 cubic feet per minute (850 liter/min). The time in the hot sintering zone was approximately 40 minutes at maximum temperature, and the entire heating time was approximately 180 minutes.

After sintering, the samples were dimensioned and weighed in order to calculate density, weight loss and dimensional change. All dimensional change was taken with respect to a die dimension. Hardness measurements were taken with a 1/16 in. ball and 100 kg (HRB scale). Tensile strength was measured using the MTS 20 kip tensile tester.

RESULTS

A comparison of particle size of the improved lubricant of the present invention with EBS discloses that while the improved lubricant of the present invention, when comprised of PTFE, specifically Teflon® MP1100, has a nominal particle size of 1.8 to 4 μm, after dispersion in the powdered compactable material, the mean particle size, measured by laser light scattering was 5 μm to 12 μm. This is probably due to agglomeration where several small particles form a cluster in the presence of the fluid medium used as a carrier for the particle analyzers that appears larger to the laser light scattering technique. EBS has a mean particle size of 7 μm. In addition, PTFE is approximately twice as dense as EBS. Therefore, PTFE occupies a smaller volume than EBS allowing for increased green density.

The data of a TGA analysis of the PTFE versus EBS for burnout characteristics is shown in Table 1 below, where a TGA cycle of basically 10° C./min from 20° C. to 650° C. in argon was utilized:

TABLE 1

| TGA Analysis Data | | |
|---|---|---|
| Temperature °C. | Wt. loss EBS (%) | Wt. Loss PTFE (%) |
| 20 | 100 | 100 |
| 50 | 100 | 100 |
| 100 | 100 | 100 |
| 150 | 100 | 100 |
| 220 | 100 | 100 |
| 230 | 99.97 | 100 |
| 240 | 99.89 | 100 |
| 250 | 99.78 | 100 |
| 260 | 99.64 | 100 |
| 270 | 99.46 | 100 |
| 280 | 99.23 | 100 |
| 290 | 98.91 | 100 |
| 300 | 98.46 | 100 |
| 310 | 97.88 | 100 |
| 320 | 97.18 | 100 |
| 330 | 96.15 | 100 |
| 340 | 94.54 | 100 |
| 350 | 92.03 | 100 |
| 360 | 88.21 | 99.95 |
| 370 | 82.19 | 99.85 |
| 380 | 73.72 | 99.78 |
| 390 | 61.88 | 99.58 |
| 400 | 46.16 | 99.13 |
| 410 | 27.84 | 98.97 |
| 420 | 11.41 | 98.79 |
| 430 | 4.508 | 98.56 |
| 440 | 2.176 | 98.28 |
| 450 | 0.8991 | 97.96 |

TABLE 1-continued

| TGA Analysis Data | | |
|---|---|---|
| Temperature °C. | Wt. loss EBS (%) | Wt. Loss PTFE (%) |
| 460 | 0.3938 | 97.61 |
| 470 | 0.236 | 97.2 |
| 480 | 0.1991 | 96.67 |
| 490 | 0.1917 | 95.95 |
| 500 | 0.1898 | 94.95 |
| 510 | 0.1881 | 93.37 |
| 520 | 0.1858 | 90.92 |
| 530 | 0.1829 | 86.85 |
| 540 | 0.1785 | 79.72 |
| 550 | 0.1739 | 67.65 |
| 560 | 0.1684 | 50.04 |
| 570 | 0.1651 | 27.49 |
| 580 | 0.1626 | 8.173 |
| 590 | 0.1612 | 0.8486 |
| 600 | 0.158 | 0.5042 |
| 610 | 0.15 | 0.5008 |
| 620 | | |
| 630 | | |
| 640 | | |
| 650 | | |

Figure 1:
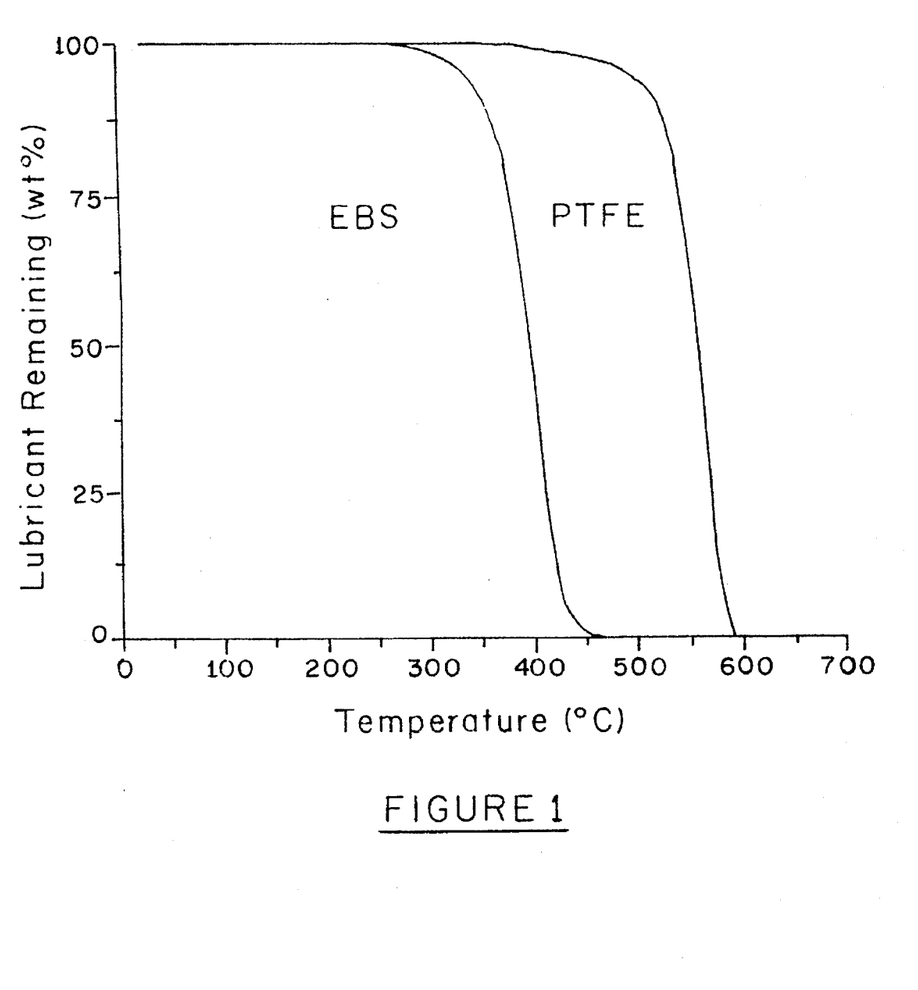
FIG. 1 is a thermogravimetric plot of the lubricant of the present invention versus EBS, where the thermal cycle was 10° C./min to 650° C. in argon.

A plot of the data is provided in FIG. 1. As shown in FIG. 1, which is a plot of lubricant content versus temperature, lubricant removal for EBS initiates at 230° C. and is generally completed by 450° C., while the PTFE is stable up to 350° C. and is basically completely removed by 600° C. Both lubricants were clean burning, but only the lubricant of the present invention is viable for warm pressing operations above 230° C.

Figure 2:
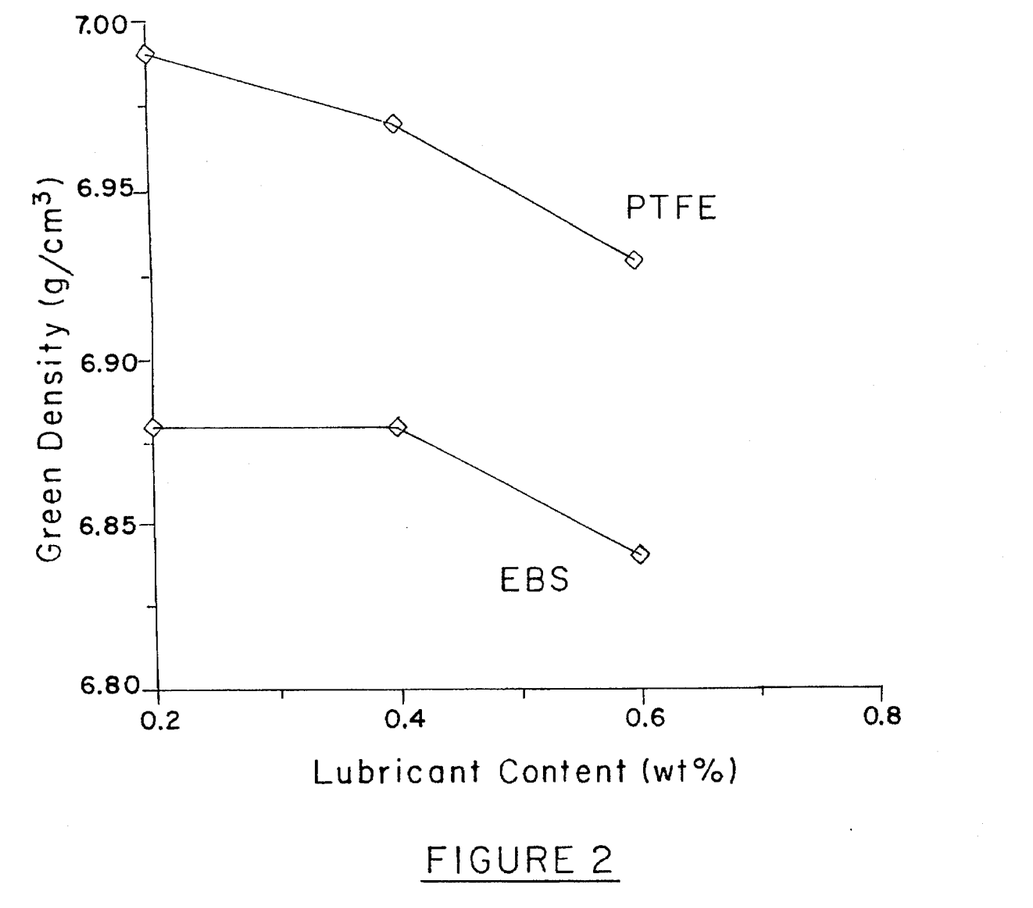
FIG. 2 is a plot of the green density for a ferrous alloy, specifically Distaloy 4800A+0.5 wt. % C, compacted at 420 MPa as a function of lubricant content.
Figure 3:
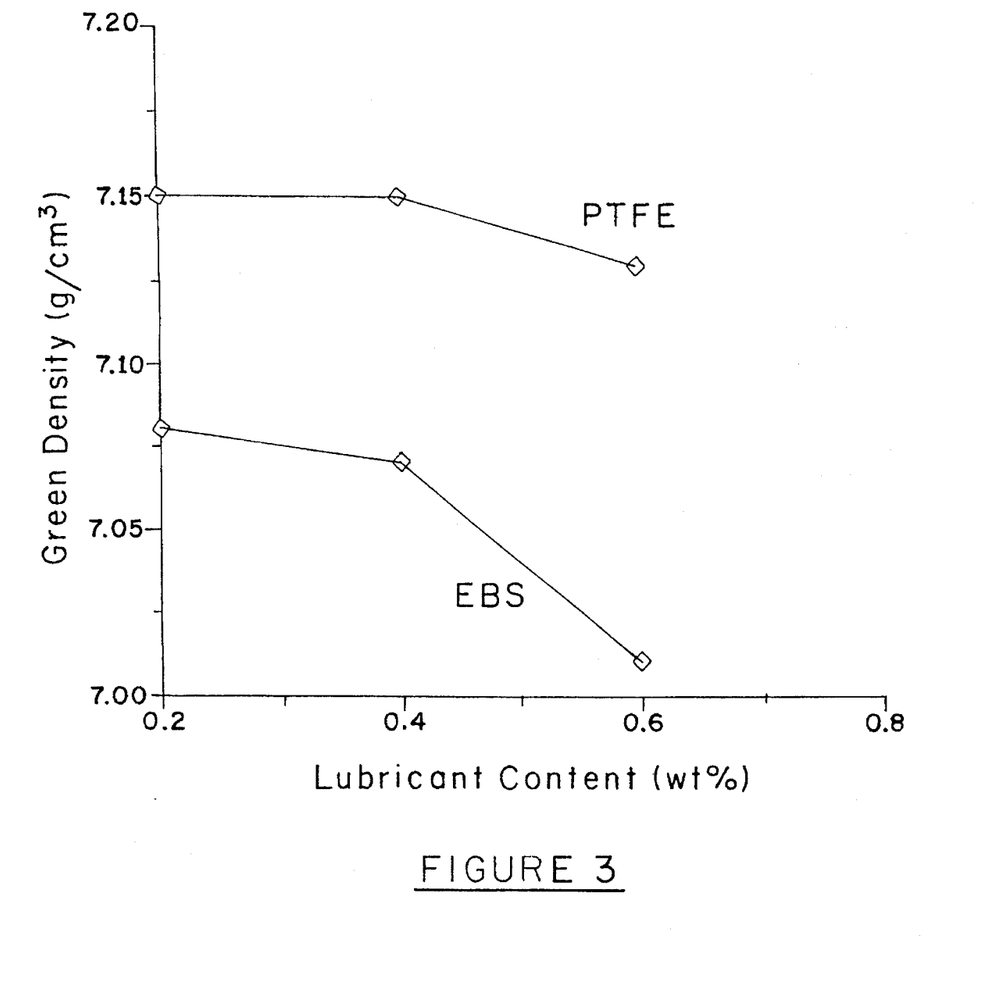
FIG. 3 is a plot of the green density for the ferrous alloy of FIG. 2 compacted at 560 MPa as a function of lubricant content.
Figure 4:
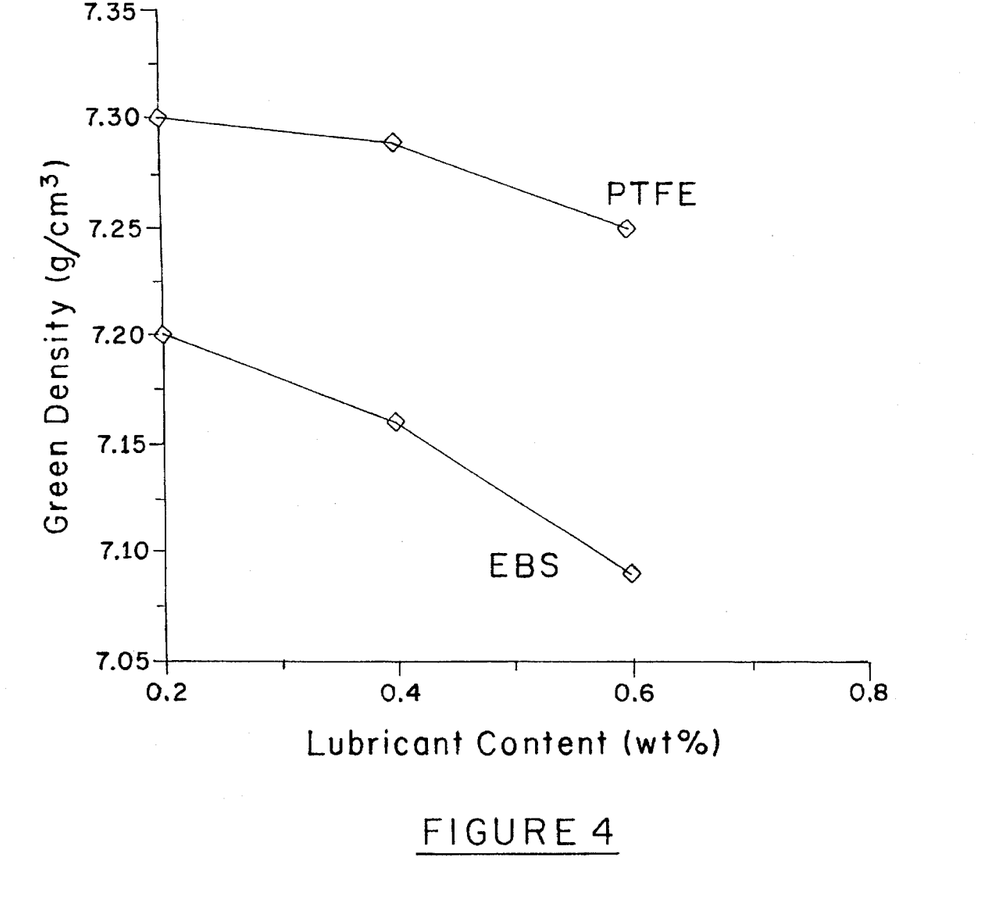
FIG. 4 is a plot of the green density for the ferrous alloy of FIG. 2 compacted at 690 MPa as a function of lubricant content.

A comparison of green density is shown in Tables 2, 3 and 4 and is plotted correspondingly in FIGS. 2–4. FIGS. 2, 3 and 4 shows the effect of varying lubricant concentration and compacting pressure on the green density of the compact for the compaction of Distaloy 4800A with either PTFE or EBS. Compacting pressures applied were 420, 560 and 690 MPa, respectively. Tables 2, 3 and 4 are shown below:

TABLE 2

| Green Densities (g/cm³) @ 30 (Tsi) or 420 (MPa) | | |
|---|---|---|
| Lubricant (Wt. %) | PTFE Green Density (g/cm³) | EBS Green Density (g/cm³) |
| 0.2 | 6.99 | 6.88 |
| 0.4 | 6.97 | 6.88 |
| 0.6 | 6.93 | 6.84 |

TABLE 3

| Green Densities (g/cm³) @ 40 (Tsi) or 560 (MPa) | | |
|---|---|---|
| Lubricant (Wt. %) | PTFE Green Density (g/cm³) | EBS Green Density (g/cm³) |
| 0.2 | 7.15 | 7.08 |
| 0.4 | 7.15 | 7.07 |
| 0.6 | 7.13 | 7.01 |

TABLE 4

Green Densities (g/cm³) @ 50 (Tsi) or 690 (MPa)

| Lubricant (Wt. %) | PTFE Green Density (g/cm³) | EBS Green Density (g/cm³) |
|---|---|---|
| 0.2 | 7.3 | 7.2 |
| 0.4 | 7.29 | 7.16 |
| 0.6 | 7.25 | 7.09 |

As shown in FIGS. 2–4, the compact with the inventive lubricant of the present invention consistently exhibited a higher green density than that of EBS, regardless of the compacting pressure. While increasing the admixed quantity of either the lubricant of the present invention or EBS, resulted in a drop in green density, those powders compacted with EBS displayed a much higher drop in green density than those compacted with the lubricant of the present invention. The lubricant of the present invention increases green density by as much as 2% over EBS.

Shown in Table 5 below, is the data for a comparison of the green rupture strength for Distaloy 4800A compacted with PTFE versus EBS 560 MPa as a function of lubricant content:

TABLE 5

Green Rupture Strength (MPa) @ 40 (Tsi) or 560 (MPa)

| Wt. % | EBS (MPa) | PTFE (MPa) |
|---|---|---|
| 0.2 | 18.33 | 22.5 |
| 0.4 | 16.5 | 23.4 |
| 0.6 | 13.1 | 23.1 |

Figure 5:
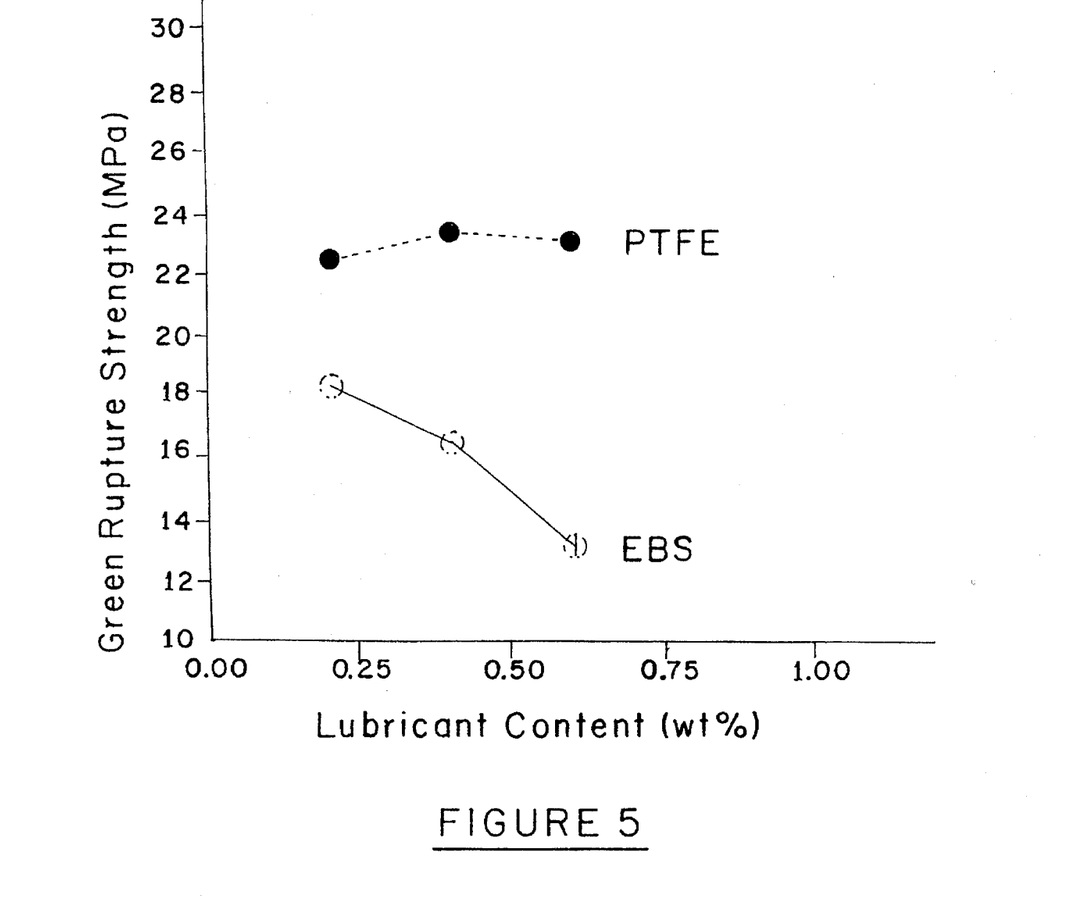
FIG. 5 is a plot of the green rupture strength for the ferrous alloy of FIG. 2 compacted at 560 MPa as a function of lubricant content.

As shown in FIG. 5, which is a plot of the data of Table 5, increasing amounts of the lubricant of the present invention does not affect green strength, while increasing amounts of EBS, results in a steady weakening of green rupture strength.

Figure 6:
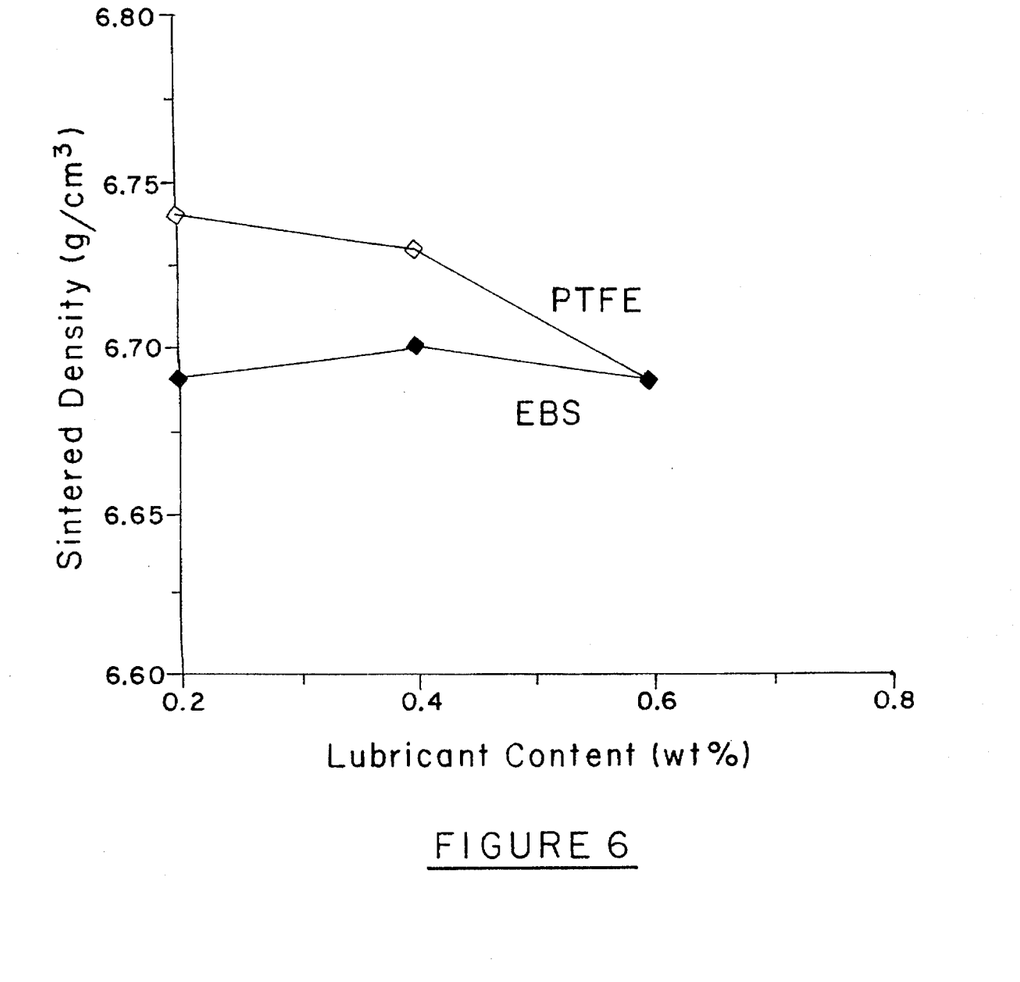
FIG. 6 is a plot of sintered density of the ferrous alloy of FIG. 2 sintered at 1260° C. and compacted at 420 MPa as a function of lubricant content.
Figure 7:
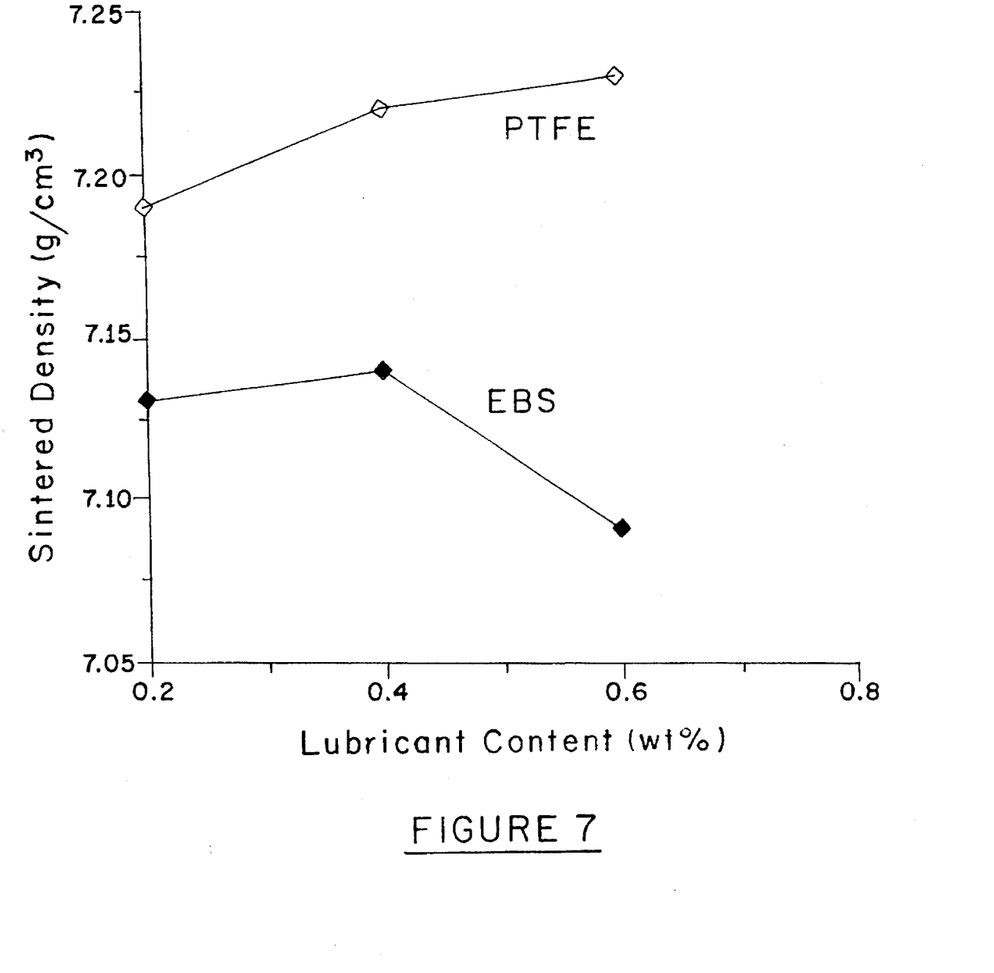
FIG. 7 is a plot of sintered density of the ferrous alloy of FIG. 2 sintered at 1260° C. and compacted at 560 MPa as a function of lubricant content.
Figure 8:
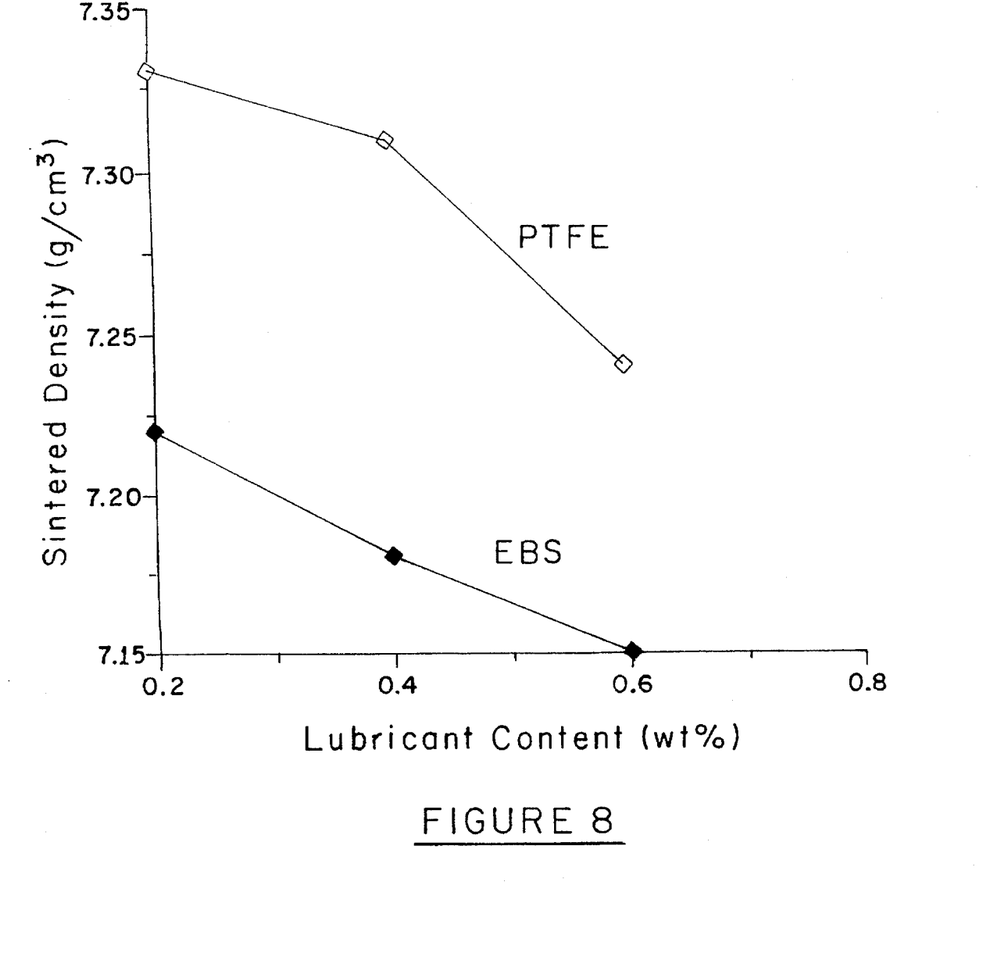
FIG. 8 is a plot of sintered density of the ferrous alloy of FIG. 2 sintered at 1260° C. and compacted at 690 MPa as a function of lubricant content.

Comparisons of the sintered densities as a function of lubricant content of Distaloy 4800A sintered at 60° C. with PTFE versus EBS are shown in Tables 6, 7 and 8, which are plotted in FIGS. 6, 7 and 8, respectively, for compacting pressures of 30 (Tsi) 420 (MPa), 40 (Tsi) 560 (MPa) and 50 (Tsi) 690 (MPa), respectively. Tables 6, 7 and 8 are shown below:

TABLE 6

Sintered Density (g/cm³) @ 30 (Tsi) or 420 (MPa)

| Lubricant (Wt. %) | PTFE Sintered Density (g/cm³) | EBS Sintered Density (g/cm³) |
|---|---|---|
| 0.2 | 6.74 | 6.69 |
| 0.4 | 6.73 | 6.7 |
| 0.6 | 6.69 | 6.69 |

TABLE 7

Sintered Density (g/cm³) @ 40 (Tsi) or 560 (MPa)

| Lubricant (Wt. %) | PTFE Sintered Density (g/cm³) | EBS Sintered Density (g/cm³) |
|---|---|---|
| 0.2 | 7.19 | 7.13 |
| 0.4 | 7.22 | 7.14 |
| 0.6 | 7.23 | 7.09 |

TABLE 8

Sintered Density (g/cm³) @ 50 (Tsi) or 690 (MPa)

| Lubricant (Wt. %) | PTFE Sintered Density (g/cm³) | EBS Sintered Density (g/cm³) |
|---|---|---|
| 0.2 | 7.33 | 7.22 |
| 0.4 | 7.31 | 7.18 |
| 0.6 | 7.24 | 7.15 |

The trend found for the green densities is likewise found for the sintered densities. Samples prepared with the inventive lubricant are up to 2% more dense than samples prepared with EBS.

Figure 9:
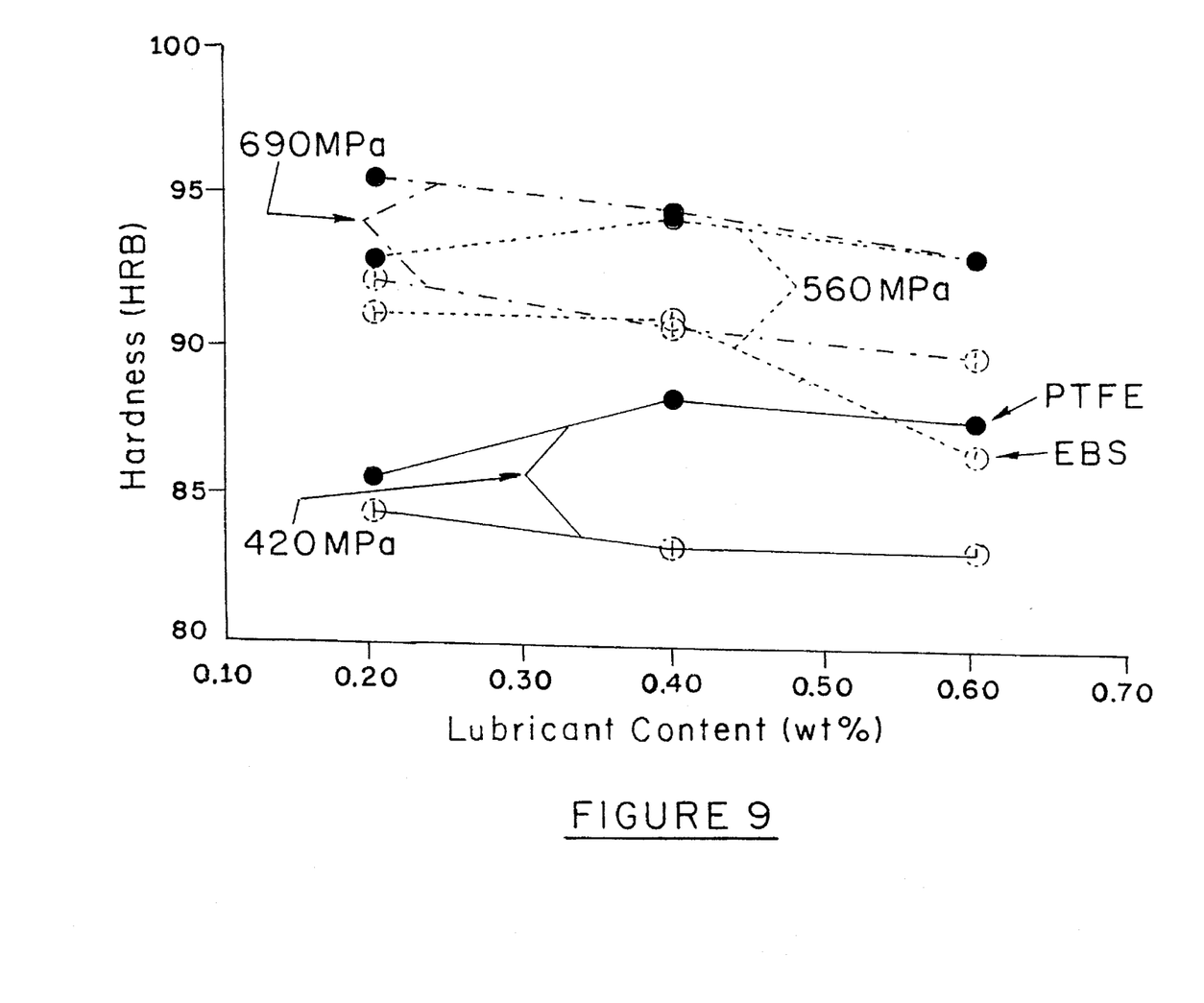
FIG. 9 is a plot of hardness for the ferrous alloy of FIG. 2 sintered at 1260° C. and compacted at 420, 560 or 690 MPa as a function of lubricant content.

Table 9 shown below and its plot at FIG. 9 provide a comparison of the hardness of Distaloy 4800A sintered at 1260° C. with PTFE versus EBS as a function of lubricant content and compaction pressure:

TABLE 9

Hardness Comparison (HRB)

| | EBS | | | Lubricant of the Present Invention | | |
|---|---|---|---|---|---|---|
| Lubricant (Wt. %) | 30 (Tsi) | 40 (Tsi) | 50 (Tsi) | 30 (Tsi) | 40 (Tsi) | 50 (Tsi) |
| 0.2 | 84.4 | 91.1 | 92.2 | 85.6 | 92.9 | 95.6 |
| 0.4 | 83.3 | 91.1 | 90.8 | 88.4 | 94.4 | 94.7 |
| 0.6 | 83.3 | 86.7 | 90 | 87.8 | 93.3 | 93.3 |

It is clear that the inventive lubricant consistently results in a harder compact than EBS. Further, FIG. 9 makes it clear that increasing EBS content is detrimental to hardness while increasing the overall weight % of the inventive lubricant does not negatively affect hardness.

Figure 10:
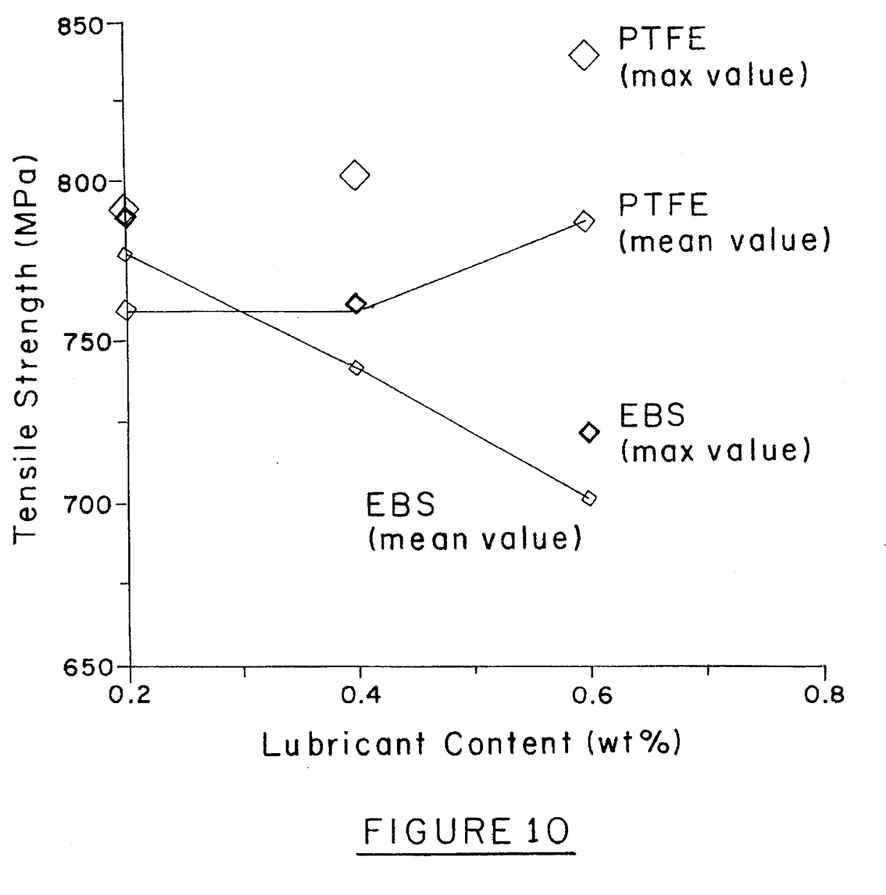
FIG. 10 is a plot of mean and maximum tensile densities for the ferrous alloy of FIG. 2 sintered at 1260° C. and compacted at 420 MPa as a function of lubricant content.
Figure 11:
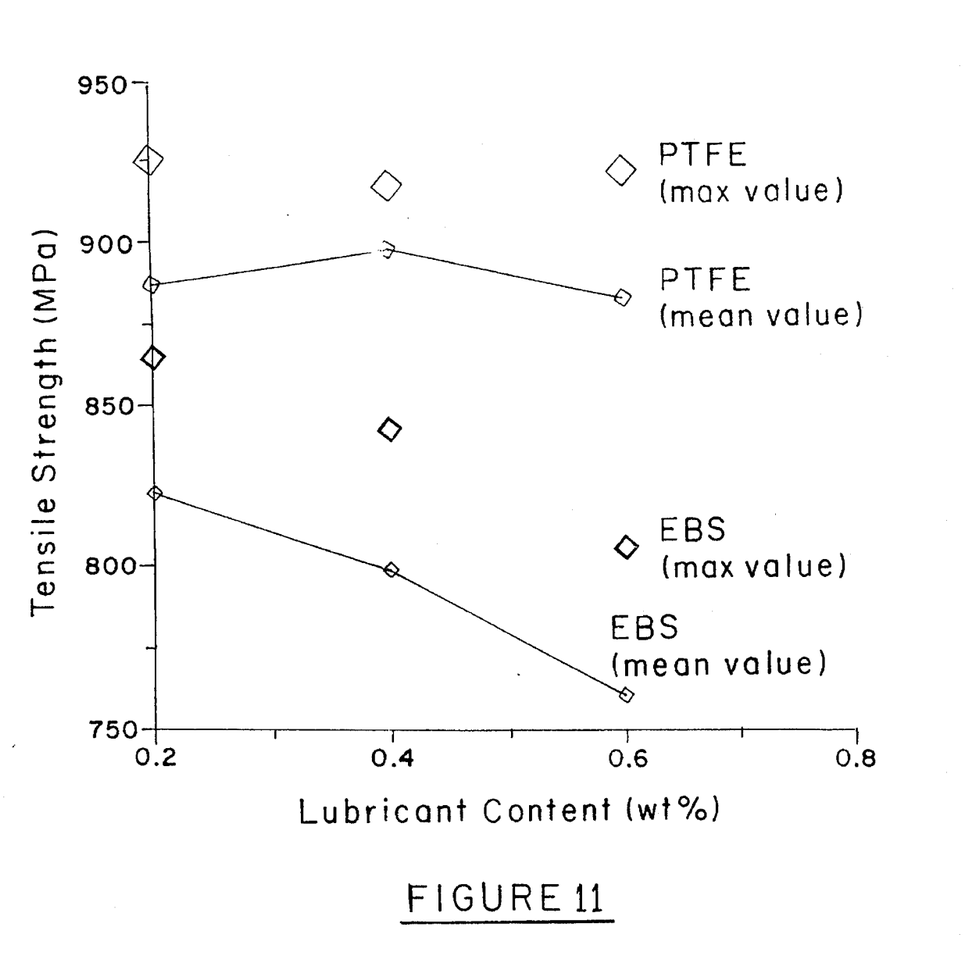
FIG. 11 is a plot of mean and maximum tensile densities for the ferrous alloy of FIG. 2 sintered at 1260° C. and compacted at 560 MPa as a function of lubricant content.
Figure 12:
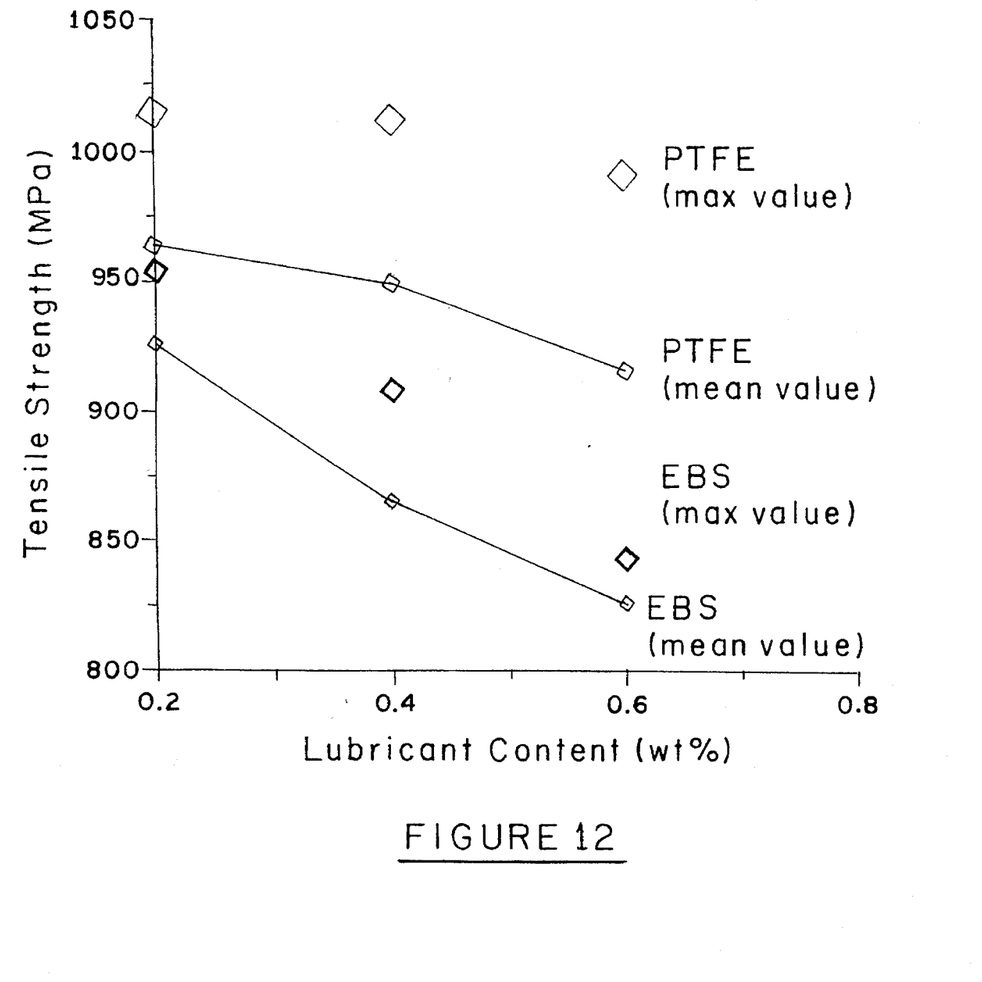
FIG. 12 is a plot of mean and maximum tensile densities for the ferrous alloy of FIG. 2 sintered at 1260° C. and compacted at 690 MPa as a function of lubricant content.

Tables 10, 11 and 12, shown below, and corresponding plots in FIGS. 10, 11 and 12 show a comparison of the mean and maximum tensile strengths for Distaloy 4800A sintered at 1260° C. and compacted at 420, 560 and 690 MPa as a function of lubricant content with PTFE versus EBS:

TABLE 10

Mean and Peak Tensile Strength (MPa) @ 30 (Tsi) or 420 (MPa)

| Lubricant Content (Wt. %) | Mean Tensile Strength PTFE (MPa) | Mean Tensile Strength EBS (MPa) |
|---|---|---|
| 0.2 | 759 | 777 |
| 0.4 | 759 | 742 |
| 0.6 | 788 | 702 |

TABLE 10-continued

| | Peak Tensile Strength PTFE (MPa) | Peak Tensile Strength EBS (MPa) |
|---|---|---|
| 0.2 | 791 | 789 |
| 0.4 | 802 | 761 |
| 0.6 | 840 | 722 |

TABLE 11

Mean and Peak Tensile Strength (MPa) @ 40 (Tsi) or 560 (MPa)

| Lubricant Content (Wt. %) | Mean Tensile Strength PTFE (MPa) | Mean Tensile Strength EBS (MPa) |
|---|---|---|
| 0.2 | 887 | 823 |
| 0.4 | 898 | 799 |
| 0.6 | 883 | 760 |
| | Peak Tensile Strength PTFE (MPa) | Peak Tensile Strength EBS (MPa) |
| 0.2 | 925 | 864 |
| 0.4 | 917 | 842 |
| 0.6 | 922 | 806 |

TABLE 12

Mean and Peak Tensile Strength (MPa) @ 50 (Tsi) or 690 (MPa)

| Lubricant Content (Wt. %) | Mean Tensile Strength PTFE (MPa) | Mean Tensile Strength EBS (MPa) |
|---|---|---|
| 0.2 | 964 | 925 |
| 0.4 | 949 | 864 |
| 0.6 | 915 | 825 |
| | Peak Tensile Strength PTFE (MPa) | Peak Tensile Strength EBS (MPa) |
| 0.2 | 1015 | 954 |
| 0.4 | 1012 | 907 |
| 0.6 | 991 | 842 |

The crosshead speed is 6.25 mm/min (0.25 in/min) and the tensile strengths represent as-sintered strengths. The tensile strengths for Distaloy 4800A prepared with the inventive lubricant are up to 16% greater than those compacted with EBS. Increasing EBS content proves to be detrimental to tensile strengths, while the inventive lubricant is beneficial. Several reasons can be used to explain this phenomenon. First, EBS has a lower density than the lubricant of the present invention and leaves larger pores behind after burnout. These large pores will lead to premature failure since they act as stress risers. Secondly, the lubricant of the present invention may act as a "getter" source, cleaning the powder during delubing. Therefore, the sintered bonds are believed to be stronger due to the cleaner surface.

Similar results were obtained when the Distaloy 4800A was substituted with a different ferrous alloy, namely FC0208. As seen in the following Table 13, the sintered densities and tensile strengths were consistently higher for the compacts formed with the inventive lubricant:

TABLE 13

A Comparison of PTFE versus EBS on the As-Sintered Densities and Tensile Strengths of FC0208 Compacted at 560 and 690 MPa at 1250° C.

| Conditions | Sintered Density g/cc | Tensile Strength MPa |
|---|---|---|
| MPIF Standard (7) | 7.1 | 523 |
| 0.6 wt. % EBS @ 560 MPa | 6.83 | 565 |
| 0.6 wt. % PTFE @ 560 MPa | 6.87 | 719 |
| 0.6 wt. % EBS @ 690 MPa | 6.87 | 663 |
| 0.6 wt. % PTFE @ 690 MPa | 7.03 | 831 |

Table 14, shown below, provides the ratios of PTFE/EBS in the four mixtures. Shown below in Table 15 are green densities, sintered densities, mean and peak tensile strengths for four mixtures of the inventive lubricant (PTFE) with standard lubricants (EBS) for the compaction of Distaloy 4800A compacted at 50 Tsi (690 MPa) and sintered at 1260° C.:

TABLE 14

PTFE/EBS Mixtures and Ratios

2T2E = .2 wt. % PTFE / .2 wt. % EBS
1T3E = .1 wt. % PTFE / .3 wt. % EBS
4E = .0 wt. % PTFE / .4 wt. % EBS
4T = .4 wt. % PTFE / .0 wt. % EBS

TABLE 15

Comparison of Green and Sintered Densities and Tensile Strengths of Distaloy 4800A Compacted at 50 Tsi (690 MPa) and Sintered at 1260° C. for the Mixtures Set Forth in Table 14

| Sample | Green Density (g/cm³) | Sintered Density (g/cm³) | Mean Tensile Strength (MPa) | Peak Tensile Strength (MPa) |
|---|---|---|---|---|
| 4T | 7.29 | 7.31 | 949 | 1012 |
| 2T2E | 7.23 | 7.22 | 937 | 983 |
| 1T3E | 7.11 | 7.05 | 881 | 905 |
| 4E | 7.16 | 7.18 | 864 | 907 |

TABLE 16

% Change in Properties of Table 15 Using EBS as the Standard

| Sample | Green Density (g/cm³) | Sintered Density (g/cm³) | Mean Tensile Strength (MPa) | Peak Tensile Strength (MPa) |
|---|---|---|---|---|
| 4T | 1.8% | 1.8% | 9.8% | 11.6% |
| 2T2E | 1.0% | 0.5% | 8.4% | 8.4% |
| 1T3E | −0.7% | −1.8% | 2.0% | −0.2% |
| 4E | 0.0% | 0.0% | 0.0% | 0.0% |

The lubricant of the present invention has significantly increased the as-sintered properties of two of the most common ferrous alloys. Improvements in the sintered properties range from 5–15% and increase in FC0208 of 60% over industrial standard. This behavior is expected for press and sinter powders and may be useful for novel compaction processes, such as warm pressing, due to its thermal stability. The new lubricant is clean burning and acts as a "getter". In addition, this lubricant allows for increased performance without modification of compaction or sintering cycles.

While the embodiments of the subject invention have been described and illustrated, it is obvious that various changes and modifications can be made therein without departing from the spirit of the invention which should limited only by the scope of the appended claims.

We claim:

1. A method for compacting powdered compactable materials by pressing and sintering comprising the steps of:
   a) selecting a compactable material;
   b) admixing a lubricant with said compactable material, wherein said lubricant includes a vinyl halide;
   c) compacting said compactable material in a press and die to form a compact;
   d) removing said compact from said die;
   e) placing said compact in a furnace containing an atmosphere comprising hydrogen;
   f) vaporizing said lubricant by heating said compact to 400° to 700° C. in said furnace;
   g) sintering said compact by further heating said compact to 1120° to 1265° C. in said furnace; and
   h) removing said compact from said furnace.

2. The method of claim 1, wherein said compactable material is selected from the group consisting of ferrous alloys, non-ferrous metals and non-metals.

3. The method of claim 2, wherein said ferrous alloy is selected from the group consisting of Distaloy 4800A and FC0208.

4. The method of claim 2, wherein said non-ferrous metal is selected from the group consisting of nickel, chromium and tungsten.

5. The method of claim 2, wherein said non-metal is selected from the group consisting of alumina and silica.

6. The method of claim 1, wherein said vinyl halide is added in the relative amount of 0.2 to 0.6 wt. % of said compactable material.

7. The method of claim 6, wherein said vinyl halide is polytetrafluoroethylene.

8. The method of claim 1, wherein said lubricant includes a mixture of said vinyl halide and one or more of the compounds from the group consisting of stearic acid, ethylene-bistearamide and zinc stearate.

9. The method of claim 8 wherein said lubricant is added in the relative amount of 0.2 to 0.6 wt. % of said compactable material and wherein said vinyl halide is added in the relative amount of 10 to 99 wt. % of said ethylene-bistearamide and said zinc stearate.

10. The method of claim 1, wherein said compacting is performed at 30 to 50 Tsi.

11. The method of claim 1, wherein said compact is maintained at said second temperature for approximately 20 to 40 minutes.

12. The method of claim 1, wherein said heating and said further heating are performed within approximately 180 minutes.

13. The method of claim 1, wherein said lubricant has a particle size of 1 to 12 μm.

14. The method of claim 3, wherein said compact has a green density of 6.8 to 7.3 g/cm$^3$.

15. The method of claim 1, wherein said compact has a green rupture strength of 22 to 24 MPa.

16. The method of claim 1, wherein said compact has a sintered density of 6.6 to 7.33 g/cm$^3$.

17. The method of claim 1, wherein said compact has a hardness of 80 to 100 HRB.

18. The method of claim 1, wherein said compact has a sintered tensile strength of over 350 MPa.

19. The product produced by the process of claim 1.

20. A pressed and sintered compact comprising a compactable material selected from the group consisting of ferrous alloys, non-ferrous metals and non-metals, wherein compactable material is admixed with a lubricant, said lubricant including a vinyl halide, wherein said compactable material is pressed to form a compact having a green density of 6.8 to 7.3 g/cm$^3$ and wherein said compact is heated in an atmosphere comprising hydrogen at 400° to 700° C. and then sintered at 1120° to 1265° C.

21. The compact of claim 20, wherein said compact has a green rupture strength of 22 to 24 MPa.

22. The compact of claim 20, wherein said compact has a sintered density of 6.6 to 7.33 g/cm$^3$.

23. The compact of claim 20, wherein said compact has a hardness of 86 to 96 HRB.

24. The compact of claim 20, wherein said compact has a sintered tensile strength of at least 350 MPa.

25. The compact of claim 20, wherein said ferrous alloy is selected from the group consisting of Distaloy 4800A and FC0208.

26. The compact of claim 20, wherein said non-ferrous metal is selected from the group consisting of nickel, chromium and tungsten.

27. The compact of claim 20, wherein said non-metal is selected from the group consisting of alumina and silica.

28. The compact of claim 20, wherein said vinyl halide is added in the relative amount of 0.2 to 0.6 wt. % of said compactable material.

29. The compact of claim 20, wherein said vinyl halide is polytetrafluoroethylene.

* * * * *